United States Patent [19]
De France

[11] Patent Number: 5,369,849
[45] Date of Patent: Dec. 6, 1994

[54] CABLE GRIPPING UNIT WITH SPRING BIASED JAW SEGMENTS

[75] Inventor: Robert V. De France, Poughkeepsie, N.Y.

[73] Assignee: Fargo Mfg. Company, Inc., Poughkeepsie, N.Y.

[21] Appl. No.: 36,936

[22] Filed: Mar. 25, 1993

[51] Int. Cl.⁵ .............................................. F16G 11/04
[52] U.S. Cl. ................................ 24/136 R; 24/115 M
[58] Field of Search ............. 24/136 R, 115 M, 134 L

[56] References Cited

U.S. PATENT DOCUMENTS

| | | | |
|---|---|---|---|
| 3,399,437 | 9/1968 | Kelly | 24/115 M |
| 3,524,227 | 8/1970 | Kelly | 24/115 M |
| 3,852,850 | 12/1974 | Filhaber | 24/115 M |
| 3,952,377 | 4/1976 | Morell | 24/136 R |
| 5,015,023 | 5/1991 | Hall | 24/136 R |
| 5,233,730 | 8/1993 | Milne et al. | 24/136 R |

FOREIGN PATENT DOCUMENTS 872864 10/1981 U.S.S.R. .............................. 24/136 R

Primary Examiner—Richard A. Bertsch
Assistant Examiner—Roland G. McAndrews, Jr.
Attorney, Agent, or Firm—Kane, Dalsimewr, Sullivan, Kurucz, Levy, Eisele & Richard

[57] ABSTRACT

The present invention is a cable gripping unit having: a casing provided with a central circular shell bore having a tapered portion terminating in a cable receiving open end and inwardly projecting stop means spaced from the cable receiving end; a gripping member within the casing and movable longitudinally thereof comprised of jaw retaining means and jaw segments; spring means engaging the gripping member and the stop means yieldingly urging the gripping member towards the cable receiving end within the tapered portion of the shell; and the jaw retaining means being circular and concentric with the shell bore and provided with a plurality of retaining slots within each, of which a respective jaw segment is disposed with the jaw segments in circular arrangement defining a cylindrical jaw bore; and the jaw segments being radially movably disposed in the retaining means so that upon the spring means yieldingly urging the gripping member toward the cable receiving end the jaw members within tapered portion define a reduced diameter jaw bore for gripping the cable.

6 Claims, 10 Drawing Sheets

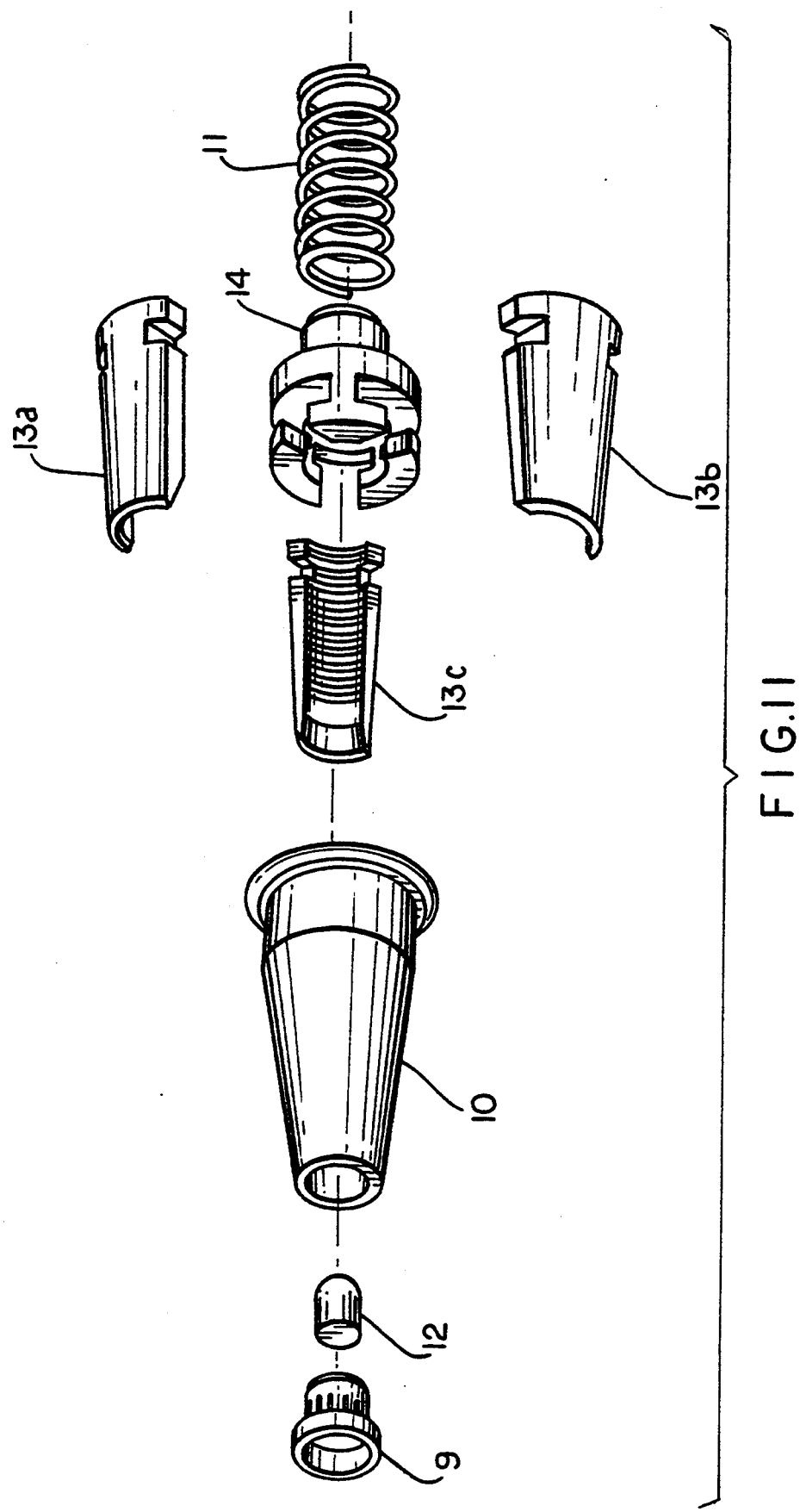

CABLE GRIPPING UNIT WITH SPRING BIASED JAW SEGMENTS

BACKGROUND OF INVENTION

In working with cables of a variety of types and particularly helical stranded transmission cables, connectors and dead end devices are used. A connector or line splice as it is sometimes called is used to couple adjacent cables. A dead end device is used to grip one end of a cable in order to anchor the same. These can be referred to generally as gripping units and are known in the trade as automatics when the line man need only insert the cable end therein and gripping is achieved without making further adjustments such as tightening of screws or bolts.

A variety of automatic gripping units and devices are available. However, for the most part prior to this invention these were not entirely satisfactory from a functional, convenience and economical point of view. From a functional point of view, the device must be easy to install and grip the cable in a positive manner immediately upon insertion and over long periods of time. The grip must be good mechanically and electrically and must insure against failure. From a convenience point of view it is desirable that one size gripping unit be capable of gripping a range of cables of different size diameters and do so without adjustment and without the use of special tools. From an economical point of view the unit should be inexpensive to manufacture, must have a minimum of parts and not require precise matching and selection of parts. Of course, the ability to use one size gripping unit for several size cables reduces the costs resulting from inventory and production tooling.

One type of cable in common use today is stranded cable in which the strands are twisted so that each of the strands is in the form of a helix. Helically wound stranded cable of this type is especially difficult to hold firmly in a gripping unit.

SUMMARY OF THE INVENTION

An improved cable gripping unit of the type having a shell with a conical bore terminating at an outer end in a cable accommodating opening and presenting a tapered bore circular in cross section, a gripping member within the bore and movable longitudinally and a helical spring thrusting against the gripping member and the shell, being provided with an improved retaining member within the shell bore, a plurality of jaw segments supported by the retaining member within the shell bore in circular arrangement, the retaining member allowing the jaw segments to ride on the surface of the shell bore and the helical spring yieldingly urging the gripping member toward the reduced end of the shell bore constricting the jaw segments with the jaw segments having portions disposed in opposite hand to the helix of cable strands engaged thereby.

DESCRIPTION OF THE DRAWINGS

FIG. 11 is an exploded perspective view of the gripping unit shown in FIG. 1;

PREFERRED EMBODIMENTS

An automatic guy wire dead end which is the subject of this invention is illustrated in the Figs. and includes a casing or shell 10 and a yoke 1 with bail 2 attached which can be easily rotated to lock into the yoke by longitudinal movement.

Figure 1:
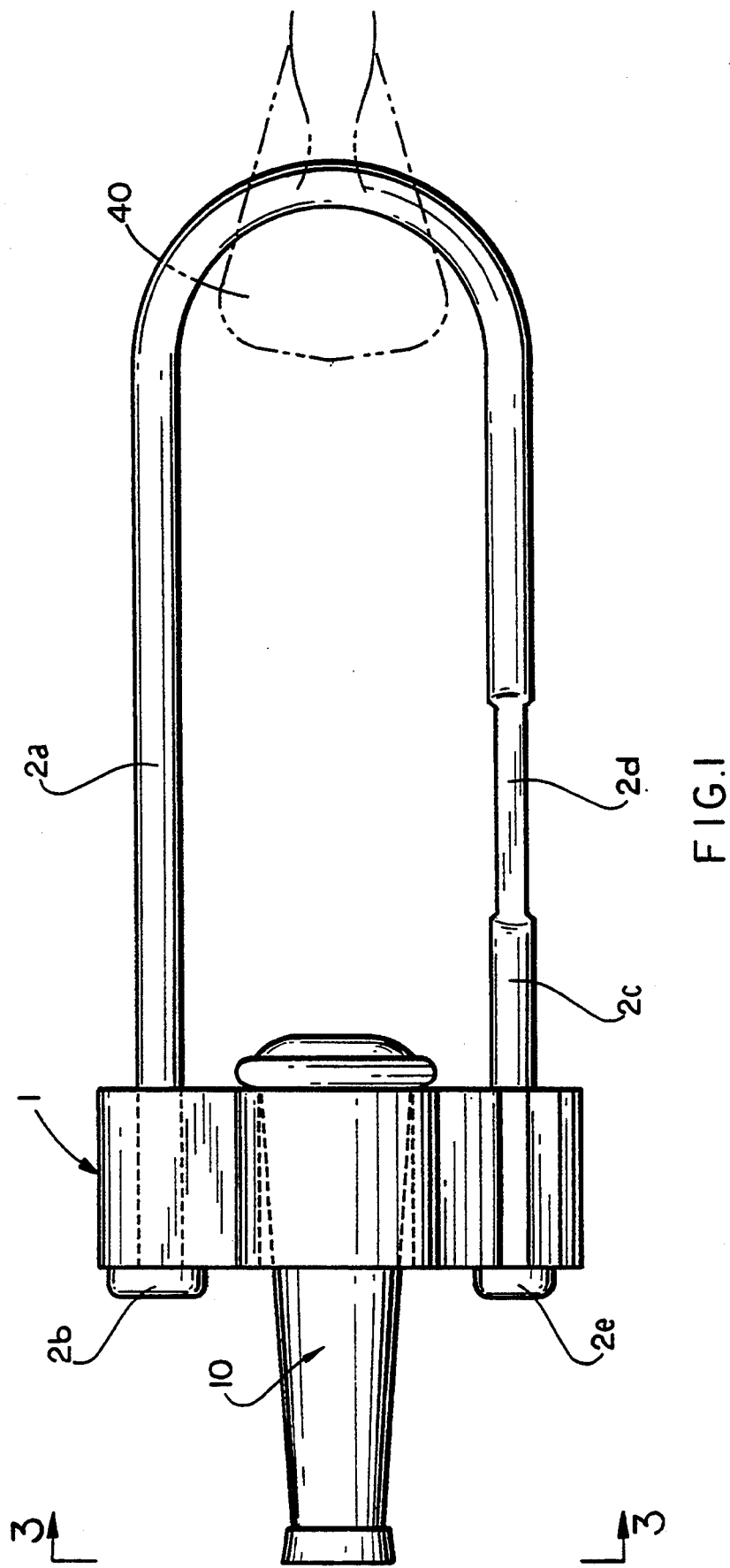
FIG. 1 is a view of the automatic guy wire dead end which is the subject of this invention installed.

The yoke 1 is provided with a cylindrical slot 1a within which one leg 2a of the U-shaped bail 2 is rotatably contained by means of knob 2b formed thereon which is circular and larger in diameter than the diameter of slot 1a. On the other side of the yoke, diametrically opposed to slot 1a a side opening slot 1b is formed for receipt of the remaining leg 2c of the bail upon rotation of the bail into position wherein flattened portion 2d of leg 2c is received within slot 1b of the yoke. The yoke and bail are slideably movable relative to each other so that in the assembled position of use of the dead end as shown in FIG. 1 the rounded portion 2c of leg 2c is captured within slot 1b in a manner similar to leg 2a in slot 1a, and maintained therein by knob 2e.

The casing or shell 10 which is formed of metal or other suitable material, is provided with a central circular shell bore 20 having a tapered portion 20a terminating in a cable accommodating opening 21 and a cylindrical portion 20b terminating in a reduced diameter opening 22 providing annular shoulder 23. The shell is engaged in the central opening of the yoke in a press fit to provide an integral unitary member.

Figure 4:
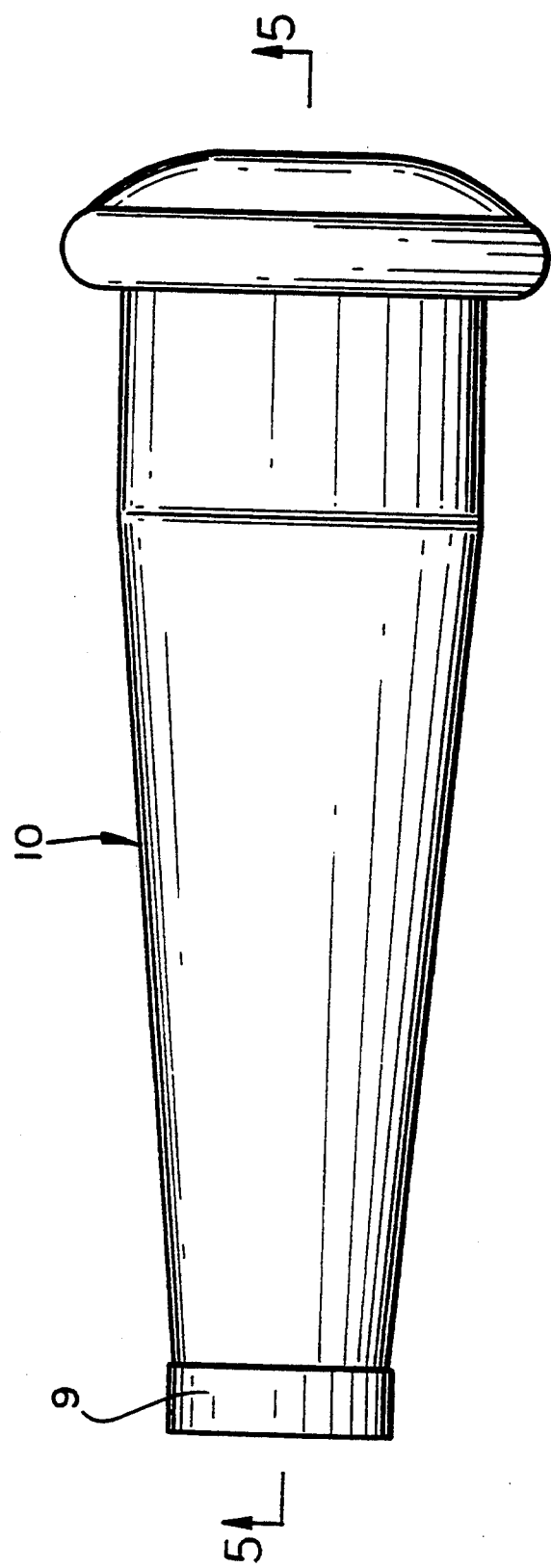
FIG. 4 is a side view of the cable gripping unit of the dead end shown in FIG. 1.

Shell 10 has disposed therein helical spring 11, gripping member 13 and cable receiving pilot cup 12. The gripping member 13 as seen in FIGS. 4 and 5 is comprised of jaw retaining member 14 and jaw segments 13a, 13b and 13c.

Figure 5:
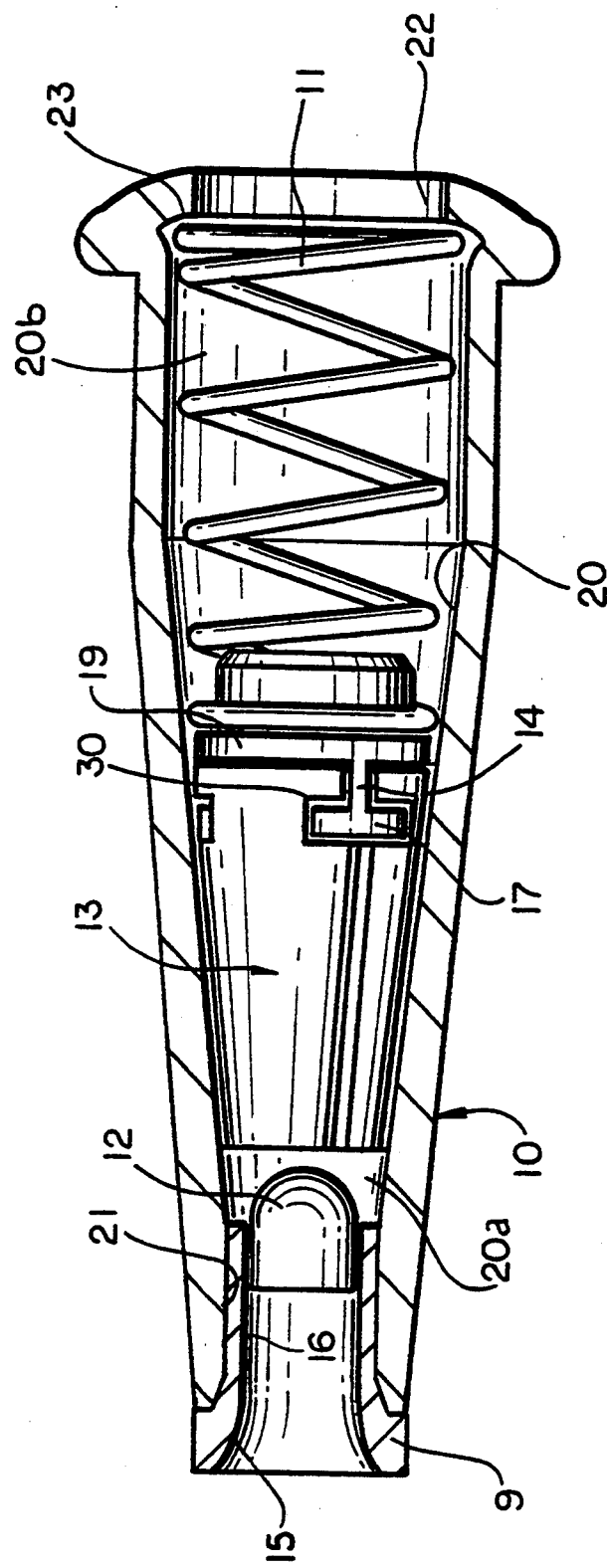
FIG. 5 is a longitudinal sectional view taken along the line 5—5 in the direction of the arrows in FIG. 4 disclosing the inner parts of the gripping unit shown in FIG. 4.

The cable receiving pilot cup 12, is initially disposed as shown in FIG. 5 within the plastic nose guide 9 which is positioned in opening 21. The cup 12 is formed from steel for strength so that the cable 8 can not pass through and designed with a round bullet nose on one end and a cylindrical end on the opposite side. The cylindrical end is the end that is initially installed into the nose guide 9 with the nose projecting into tapered portion 20a of bore 20. The cup 12 is designed so that the end has a cylindrical opening for receipt of the cable 8. The cable 8 can be inserted into the nose guide 9 at the large funnel 15 end and guided through the nose guide 9 by two parallel (cylindrical) walls 16, entering the cylindrical opening in the cup 12. The cup 12 then guides the end of the cable 8 through gripping member 13. It then passes through helical spring 11 which is generally disposed with one end thrusting against jaw retaining member 14 and its remaining end thrusting against shoulder 23 yieldingly urging gripping member 13 toward the reduced end opening 20a.

Jaw retainer member 14 is formed of a suitably hard material and can be a die casting. It is restricted in length and generally circular with a plurality of outwardly T shape tabs 17. The retainer 14 is designed so that the one end has a cylindrical boss 18 that can be installed into the inside of the helical spring 11. The inside of the cylindrical boss 18 is hollow, allowing the passing through of the cable 8. The outside edge of the cylindrical boss 18 has a chamfer which is used for easy assembly in to the helical spring 11. At the other end of the cylindrical boss 18 is a large flange 19. The flange 19 has two functions. One surface 24 acts as a shoulder for the helical spring 11 to set against. The opposite surface 25 acts as a back stop for the jaws 13 and a bearing surface 25 for the jaws to travel on a center axis 26 upon outward movement toward the cylindrical shell 20. The outer diameter 27 of this flange 19 also acts as a guide for holding the gripping assembly in the center of this cylindrical shell 20.

The T shaped tabs 17 are positioned on the back stop side 25 of the flange 19 and are evenly spaced within a 360 degree circle. Tabs 17 are set at a 90 degree angle from the back stop 25 side of the flange 19. In between the tabs 17 are gripping jaw segments 13. The tabs are positioned on the flange 19 to form a hollow cylindrical passage 28 through the center. The cable 8 can pass through the center of the retainer 14 with the gripping segments surrounding the circumference of the cable 8. The wall 28 of the tabs 17 acts as a stop for the gripping jaw segment 13 to rest against. Thus preventing the gripping jaws from passing entirely through the center of the retainer 14.

The tops of the tabs 17 serves as a guide for the jaws 13. The left end of the top of the tabs is for a groove 30 in the right side of the jaw. The other end of the top of the tab is for the left side of the groove for the next jaw in the circular assembly. This sequence continues around the entire circular assembly and forms the gripping assembly device.

The outer edge of the tab is tapered to conform to the inside taper of the cylindrical shell 20. The left outer edge of one tab 17 and the right outer edge of the next adjacent tab 17 are parallel with each other. These two parallel edges receive a jaw 13 with two grooves 30. At the bottom of these two grooves the surface is parallel to match the two parallel edges. Therefore, preventing the jaw segment 13 from separating from the retainer 14.

The jaw segments 13 are produced by a powder metal process. The outer surface of the jaw is shaped in a spherical radius 31 that conforms to the inside shape of the cylindrical shell 20. The inner surface 32 of the jaw 13 has a concave radius in order to match the outside radius of the cable 8. The front portion of the teeth have a flat leading surface. This flat leading surface 33 prevents the jaw from damaging the cable 8 when its under tension. The front edge of the jaw has two grooves one on each side of the jaw 13. These grooves 30 serve as a guide when assembled to the retainer.

After assembly to the retainer 14 the back edge of the groove makes contact with the inside edge of the tab 17 portion of the retainer 14 during the initial gripping of the cable 8. With all the tabs being as one member and forming the retainer 14, this allows the gripping jaw 13 and retainer 14 to act as one assembly.

Figure 2:
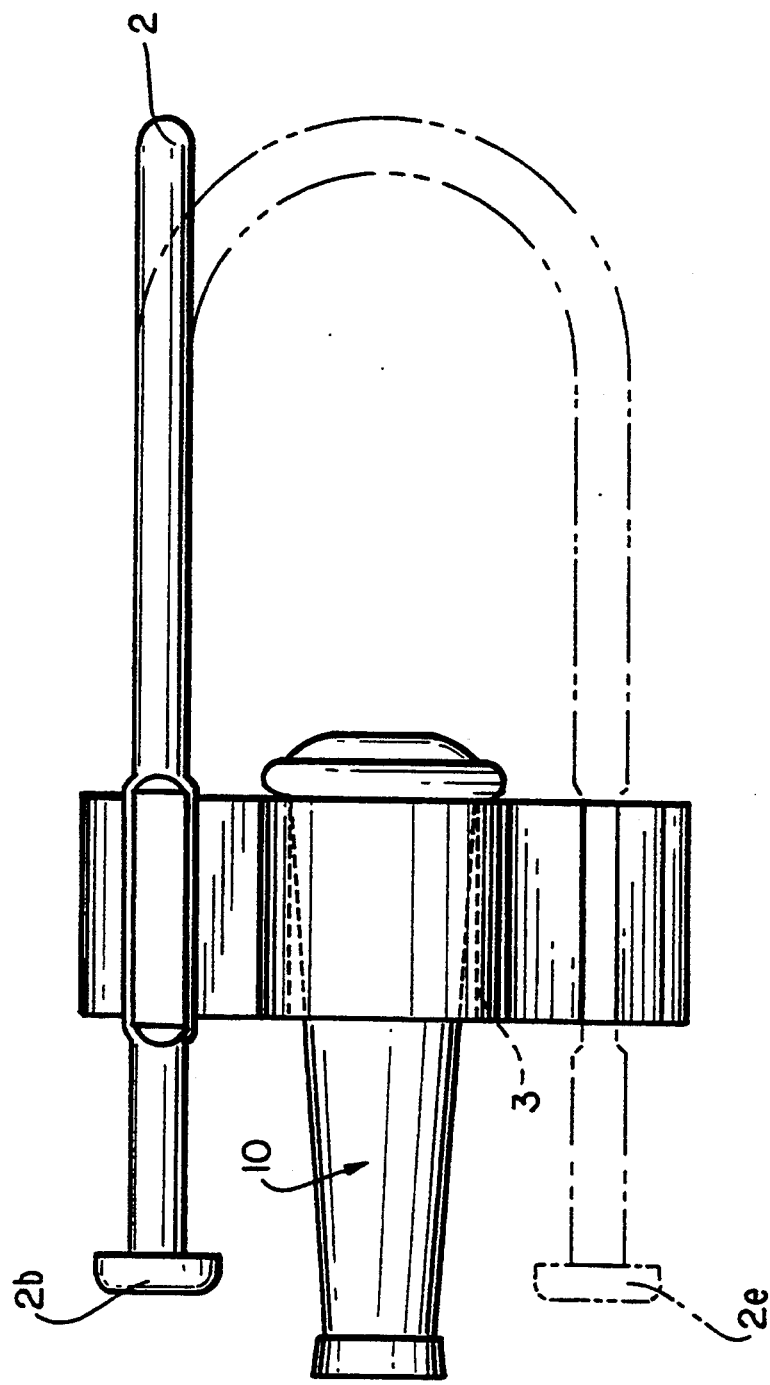
FIG. 2 is a view similar to that of FIG. 1 with the bail shown in position prior to installation.
Figure 3:
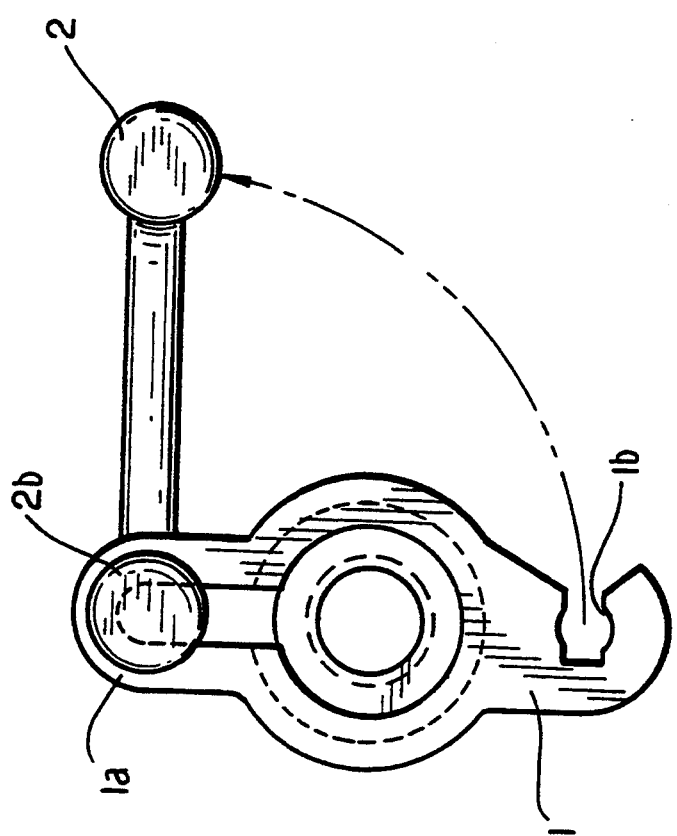
FIG. 3 is an end view of the dead end taken in the direction of the arrows designated 3—3 in FIG. 1.

In use a line man will suitably grasp the connector with the bail in a position similar to that shown in full lines in FIGS. 2 and 3, engage anchor eye 40 and rotate the device until portion 2d of leg 2c of the bail enters slot 16 of the yoke. Bail and yoke will then be moved relative to each other and into the position shown in FIG. 1.

Figure 6:
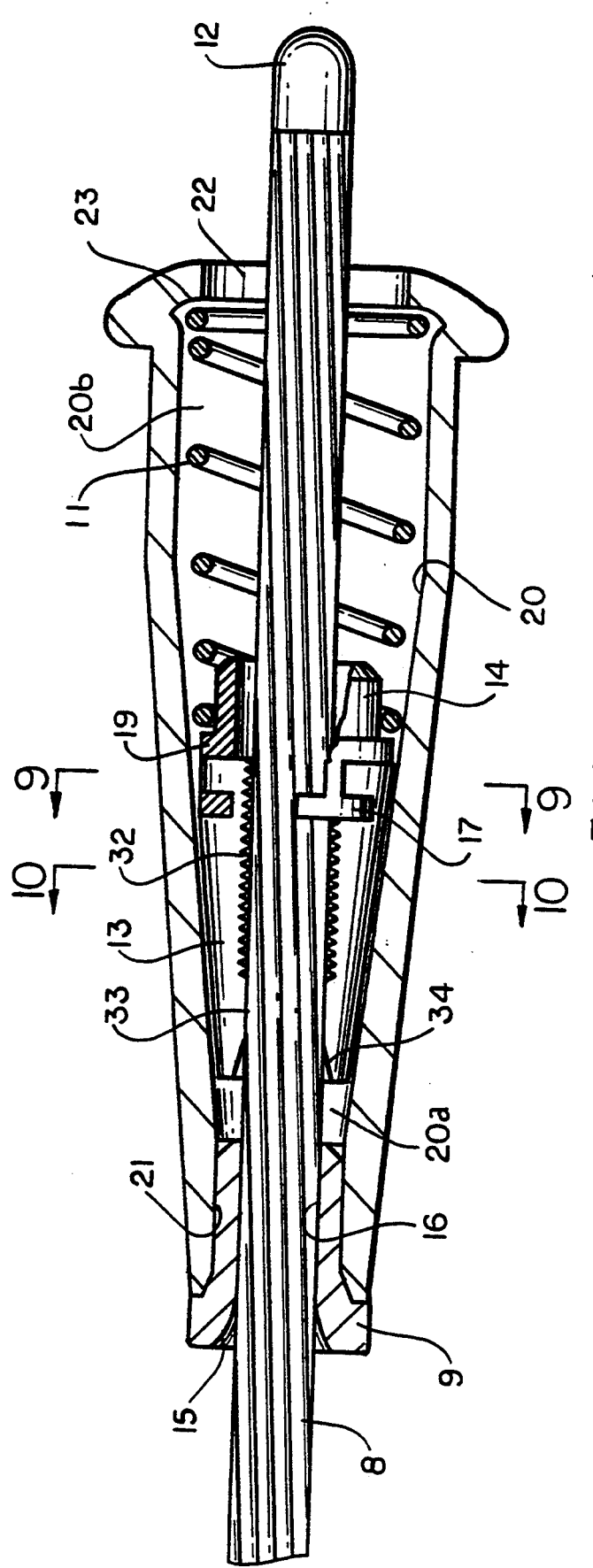
FIG. 6 is a view similar to FIG. 5 in which a guy strand is received in the dead end in gripping relationship.
Figure 7:
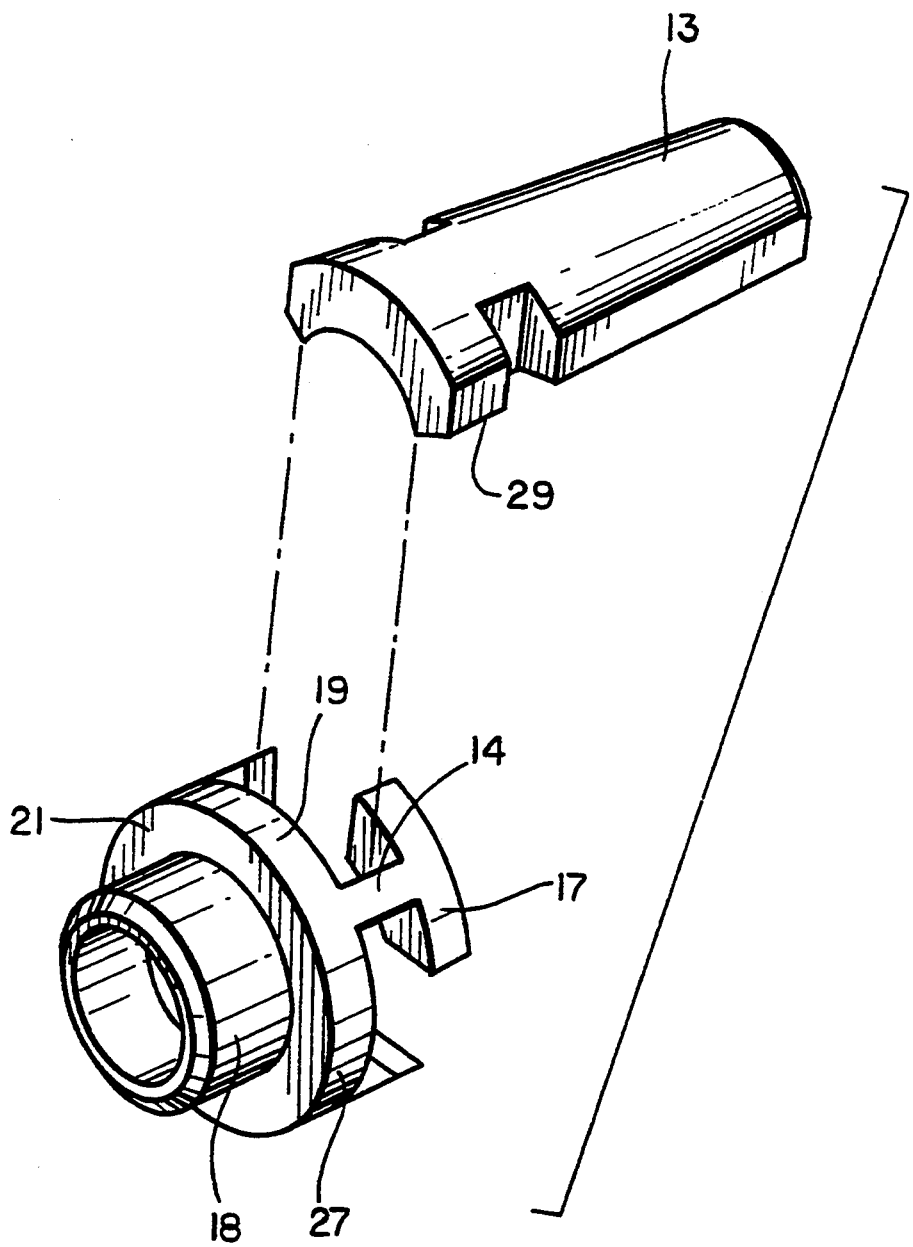
FIG. 7 is an enlarged perspective view of a jaw retainer utilized in the gripping unit shown in FIG. 1 with a jaw segment shown exploded therefrom.
Figure 8:
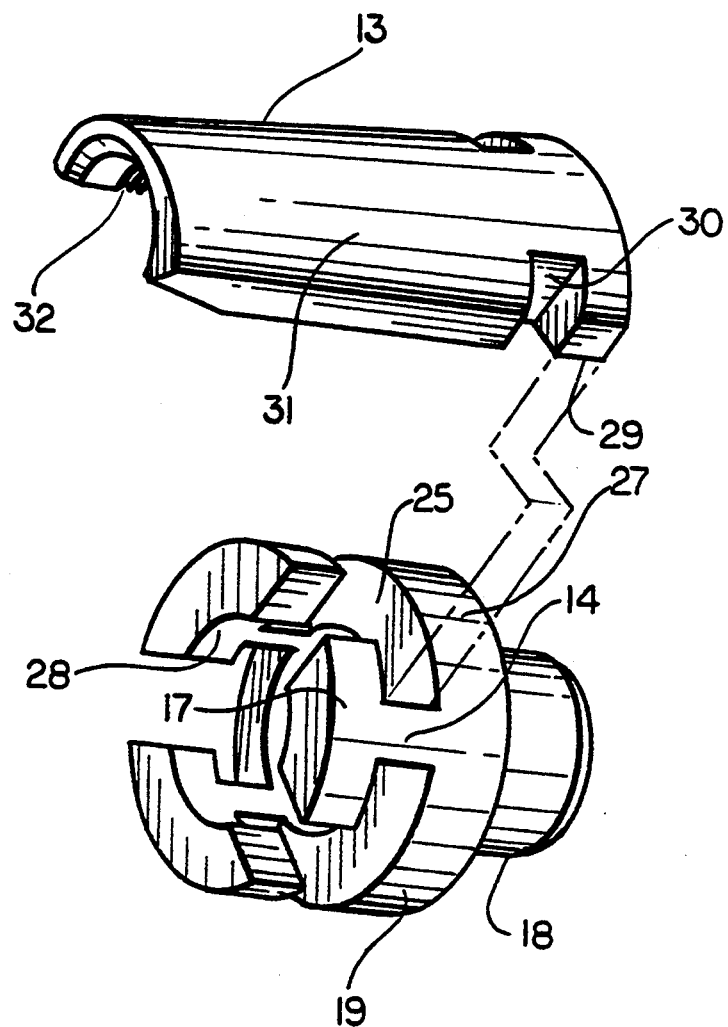
FIG. 8 is a view similar to FIG. 7 but from the opposite direction of view.
Figure 10:
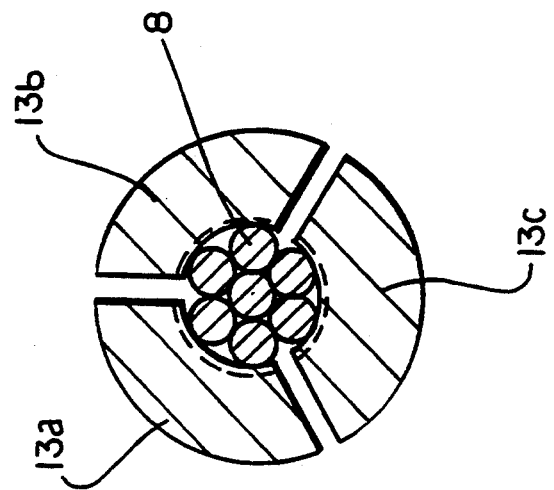
FIG. 10 is a transverse sectional view taken along the line 10—10 in the direction of the arrows in FIG. 6.
Figure 9:
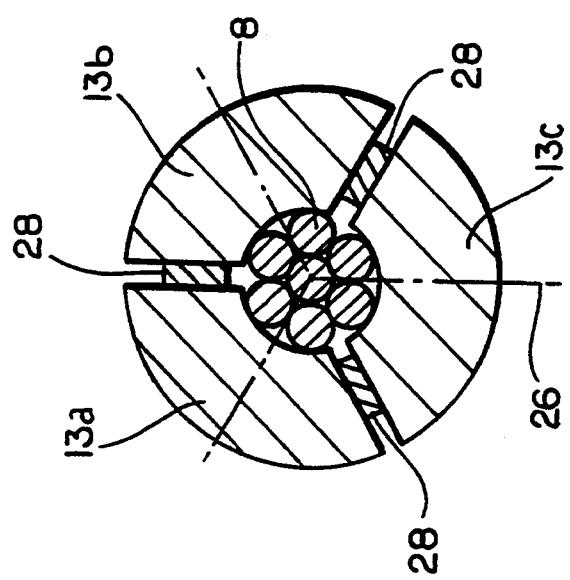
FIG. 9 is an enlarged transverse sectional view taken along the line 9—9 in the direction of the arrows in FIG. 6.

The end of cable 8 is inserted through the center of the nose guide 9 and into the cup 12 and driven relative to shell 20 within the cylindrical jaw bore defined by the jaw segments 13 which are held in position by the retaining member 14 which is concentric with the shell bore 20. The cable 8 upon moving to the right as seen in FIG. 6 will hold the gripping member 13 to the right against the force developed by helical spring 11 which is tending to move the gripping member to the left. The configuration of the retainer 14 will allow the jaw segments 13 to move apart and receive the end of cable 8 as the gripping member is moved to the right and to the larger diameter portion of the shell bore 20. After the cable 8 has passed through the gripping member and the force directing the cable 8 to the right is released the helical spring 11 will yieldingly urge the gripping member toward the reduced end of the shell 20a constricting the jaw segments 13 which are yieldingly urged to ride on the surface of the shell bore 20a by the retaining member 14. The constricting of the jaw segments 13 results in a decreased diameter jaw bore 20 and a gripping action of the jaw segments 13 upon the cable 8 which occurs automatically and which will increase with the application of a force to the left in FIG. 6 on cable 8 attempting to withdrawn the cable 8 from the gripping unit. The self adjusting nature of the device allows it to adapt itself to several different wire diameters. The concave radius jaw teeth of inner surface 32 provide an improved initial bite and positive grip on the cable 8. Improved radial distribution is achieved in the unit by the use of an odd number of jaw segments 13. It is not possible to have at all times dimensionally correct segments 13 and shells 10. In such a system as is herein provided deviation in the dimension of components is allowed for since such deviation is negated.

I claim:

1. A cable gripping unit including in combination:
    a casing provided with a central circular shell bore having a tapered portion terminating in a cable receiving open end and inwardly projecting stop means spaced from said cable receiving end;
    a gripping member within said casing and movable longitudinally thereof comprised of jaw retaining means and jaw segments;
    spring means engaging said gripping member and said stop means yieldingly urging said gripping member towards said cable receiving end within said tapered portion of said shell; and
    said jaw retaining means being circular and concentric with said shell bore and provided with a plurality of retaining slots within each of which a respective jaw segment is disposed with said jaw segments in circular arrangement defining a cylindrical jaw bore; and said jaw segments being radially movably disposed in said retaining means so that upon said spring means yieldingly urging said gripping member toward said cable receiving end said jaw members within said taper portion define a reduced diameter jaw bore for gripping said cable; wherein the jaw retaining member is hollow providing a cable passage and includes a cylindrical flange with a first side thereof abutting said spring means, spaced members longitudinally projecting from a remaining second side of said flange providing said retaining slots therebetween for disposition of said jaw segments abutting said second side and bearing surfaces for said jaw segments upon radial movement thereof.

2. A gripping unit in accordance with claim 1 in which said jaw segments are formed of powder metal.

3. A gripping unit in accordance with claim 1 in which a cable receiving pilot cup is initially disposed at said cable receiving opening for engagement with said cable and the remaining end of the shell is open for passage of said pilot cup and said cable.

4. A cable gripping unit in accordance with claim 1 in which said spring means is a helical spring and a boss is provided upon said first side of said flange with a chamfer edge for insertion within the end of said helical spring.

5. A cable gripping unit in accordance with claim 4 in which said spaced members are T-shaped with a horizontal portion of the T circular and bearing against the inner surface of said shell and the sides of a vertical portion providing bearing surfaces for said jaw segments.

6. A gripping unit in accordance with claim 5 in which a yoke is provided for said shell with a U shaped bail attached and in which the yoke is provided with a cylindrical first slot within which one leg of the U-shaped bail is rotatably contained, and on the other side of the yoke, diametrically opposed to said first slot, a side opening second slot is formed for receipt of the remaining leg of the bail upon rotation of the bail into position wherein a flattened portion of said remaining leg is received within said second slot, the yoke and bail being slideably movable relative to each other so that in the assembled position of use the rounded portion of said second leg is captured within said second slot in a manner similar to said first leg in said first slot, said shell being engaged by said yoke in a press fit to provide an integral unit.

* * * * *